INVENTORS
ALFRED W. DÜRR
OTTO C. GUNSSER
HUBERT M. HELLER

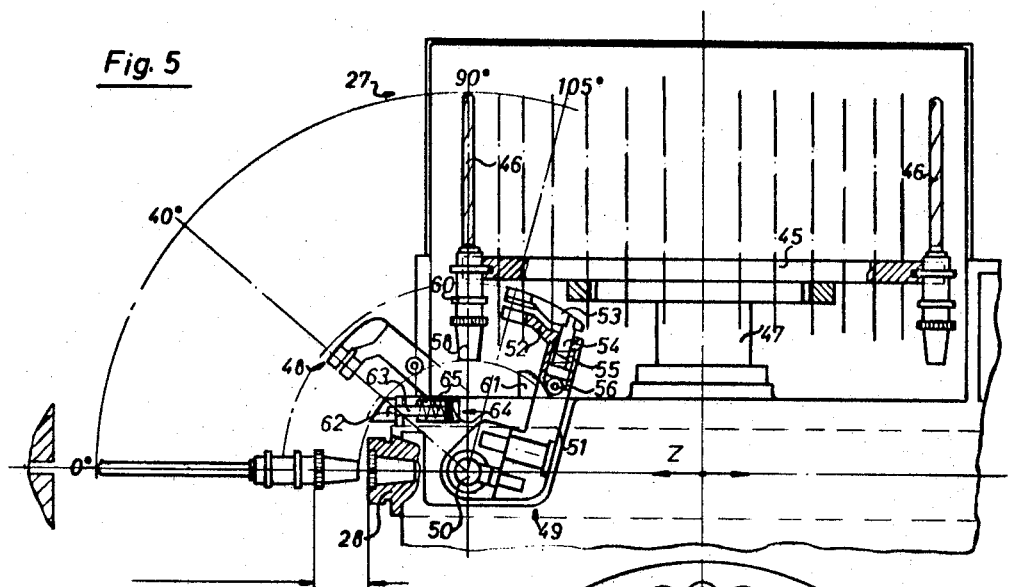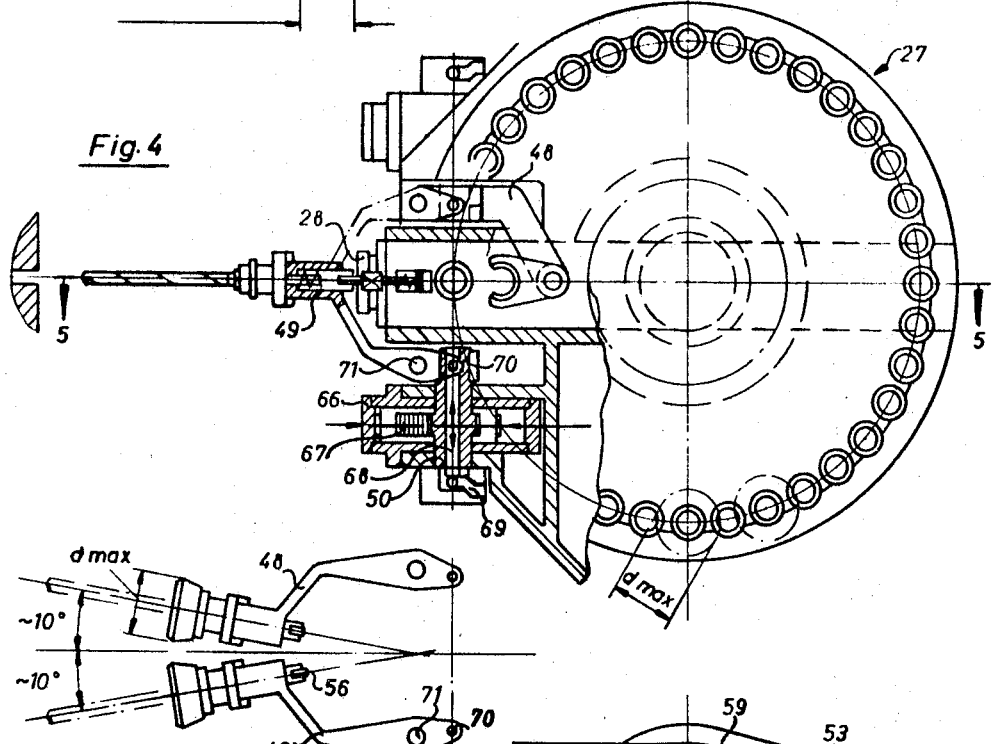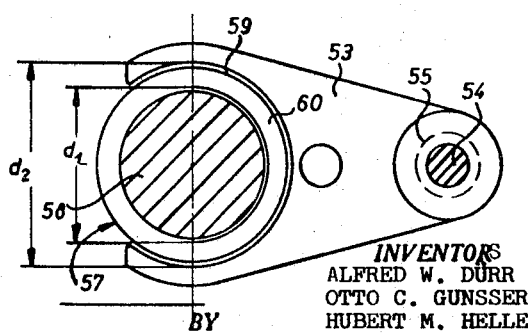

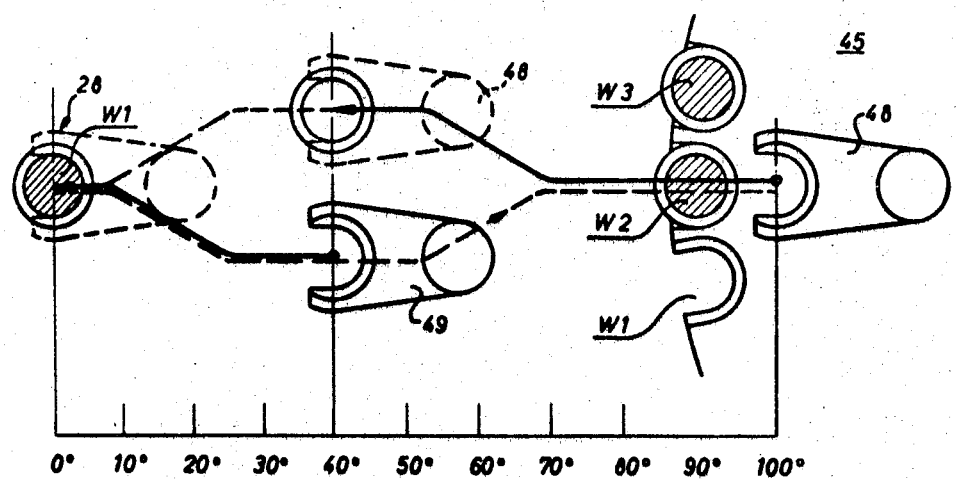

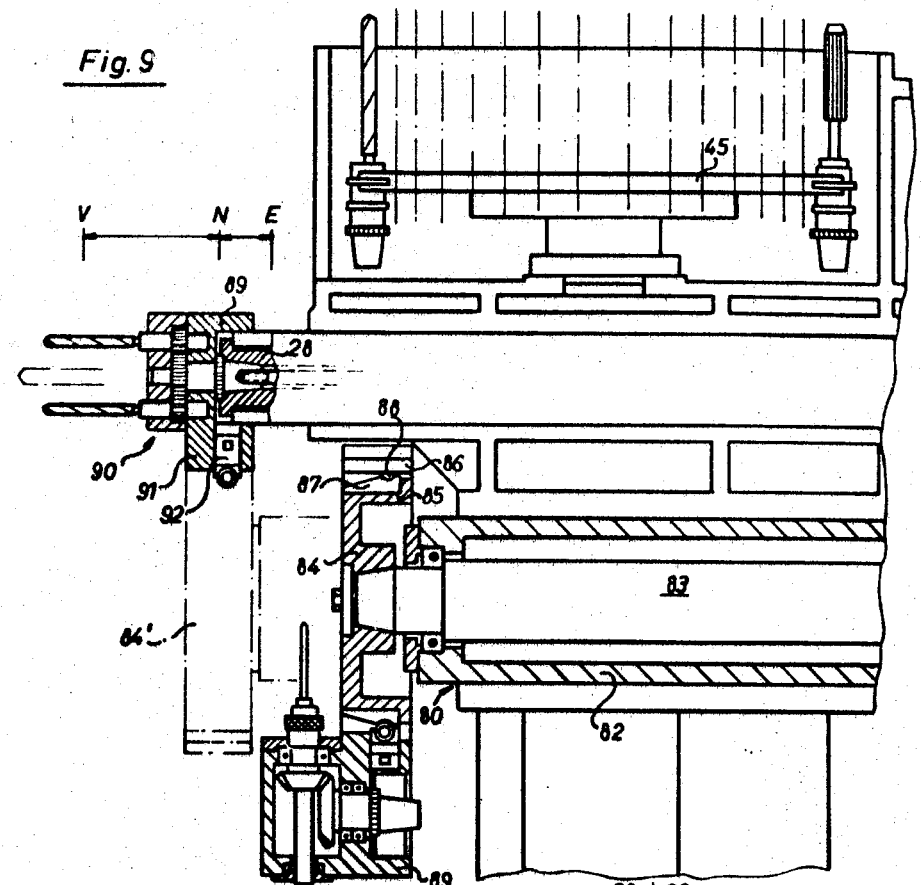
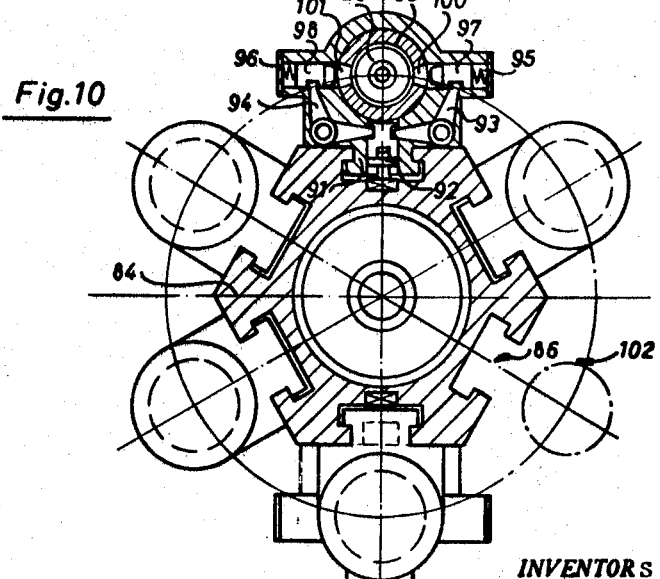

Aug. 18, 1970    A. W. DÜRR ET AL    3,524,248
MACHINE TOOL WITH AUTOMATIC TOOL CHANGING
Filed Sept. 13, 1967    8 Sheets-Sheet 7

INVENTORS
ALFRED W. DÜRR
OTTO C. GUNSSER
HUBERT M. HELLER
BY

INVENTORS
ALFRED W. DÜRR
OTTO C. GUNSSER
HUBERT M. HELLER

No. 3,524,248
Patented Aug. 18, 1970

3,524,248
MACHINE TOOL WITH AUTOMATIC
TOOL CHANGING
Alfred W. Dürr, Otto C. Gunsser, and Hubert M.
Heller, Nurtingen, Wurttemberg, Germany, assignors to
Gebruder Heller Maschinenfabrik G.m.b.H., Nurtingen,
Wurttemberg, Germany
Filed Sept. 13, 1967, Ser. No. 667,441
Int. Cl. B23g 3/157
U.S. Cl. 29—568          10 Claims

ABSTRACT OF THE DISCLOSURE

A machine tool with automatic tool changing is described with a rotatable tool magazine positioned above the tool spindle and two pair of gripper jaws for swiveling tools between the magazine and spindle. A fixed cam is provided for opening the holding jaws at the magazine and a retractable cam for opening the jaws at the spindle. The pairs of jaws are moved apart and pass each during travel between the magazine and spindle.

---

Figure 1:
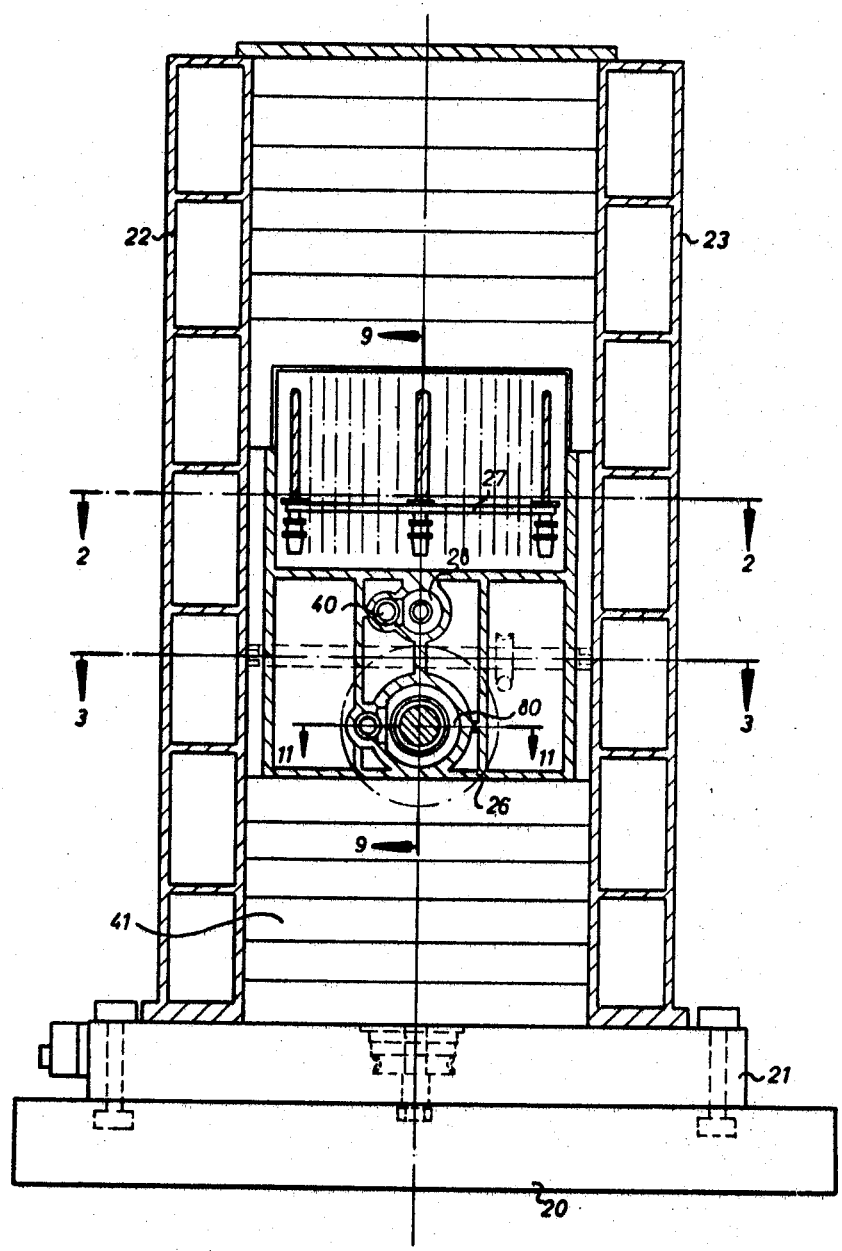

The invention relates to a machine tool with automatic tool changing and with a magazine arranged on a common slide with the tool spindle.

A machine tool of this kind which has been proposed earlier, is equipped with at least two spindles offset by 180°, or possibly with additional spindles arranged in a turret head, one of which always faces the workpiece. For practical reasons the size of the turret head is restricted, so that the maximum axial distance between the spindle bearings and also the maximum drilling diameter must fall within comparatively narrow limits.

The invention therefore aims to provide a machine tool of the type mentioned above which does not entail these limitations and which in particular can operate with a tool which has long reach in order to achieve the highest possible precision. For this purpose it is in the first place necessary to select a position and shape for the guides, the points of action of the feed forces and the arrangement of the drive elements, such that maximum accuracy is ensured for positioning and sliding movement.

This problem is solved in accordance with the invention in that the slide which carries the tool spindle and the tool magazine is guided between two columns in the vertical axis ($y$ axis), said columns being provided with guides which have racks engaging with pinions on the slide, in that the tool spindle is mounted in a spindle sleeve which moves in the direction of the feed movement ($z$ axis) and in that the two columns are arranged on a slide plate which moves in the horizontal direction ($x$ axis).

In cases where deeply recessed surfaces of the workpiece must be machined the tools must have a considerable reach, and movement of the slide unit in the vertical direction must remain accurate over a long period of time. In accordance with a further embodiment of the invention, accurate movement of this kind can be achieved most reliably in that in addition to the two racks, arranged e.g. at the front, at least one rack, and a corresponding pinion, are arranged e.g. at the back. In this way the centre of gravity of the slide can be located between the racks, preferably of course equidistant from all the racks, so that all the racks are exposed to loading which is as uniform as possible. Preferably the arrangement will also be such that in each case two pinions engaging with a rack are arranged on a common shaft at the front or back, each shaft being provided with a worm wheel which engages with a common worm shaft driven by the $y$ feed drive.

If movement is to be accurate, it is also necessary for the guides and in particular the drives to be protected to the greatest possible extent against the shavings which are bound to be formed during machining work, and also against other types of contamination. In accordance with a further embodiment of the invention this is achieved in that the space between the columns is covered with telescopic plates at least below the slide and at least on the front side.

In the case of tools with very long reach it is practically impossible to prevent the spindle or even a part of the slide from being deformed slightly by the unilateral loading and these slight deformations are reflected in a deviation in the position of the tool tip; since the tool reach occurs only in the $z$ axis, there will of course only be a deviation in the $y$ axis if the $z$ axis is horizontal. In accordance with a further embodiment of the invention, the slide is therefore provided with an adjusting device to obtain a precisely horizontal position in the $z$ axis. In principle this adjusting device can be controlled manually, but in order to obtain fully automatic operation which is clearly desirable for a machine incorporating automatic tool changing, the adjusting device is preferably controlled automatically by means of an electronic spirit level.

If the machine tool is equipped with a common worm shaft for the $y$ feed, the adjusting device will preferably influence this worm shaft. For this purpose the worm shaft may be divided e.g. within the adjusting device, so that relative rotation of the two worm shaft sections is possible within the given limits. Excessive tilting of the slide would cause the latter to become wedged in its guides and might damage these guides.

A machine tool of the type mentioned earlier has already been suggested in which the tool magazine is arranged over the spindle and holds the tools vertical to the spindle axis while a gripper mechanism which swivels the tools into the axis of the spindle is provided. An arrangement of this kind will preferably also be chosen for the machine tool in accordance with the invention, at least in cases where a wide range of tools must be provided, e.g. for the different types of drill and small milling cutters.

In the case of the earlier machine tool a gripper mechanism is provided which completes traversing movements parallel to the spindle axis. Where movements of this kind occur, sufficient space must be available between the tool position in the magazine and the tool holder in the spindle; the tool position in the magazine may therefore have to be set relatively far back, so that a considerable part of the space above the spindle cannot be utilized to house the tool magazine. In accordance with the spindle; the tool position in the magazine may therefore provided which only completes swivelling movement; this gripper acts in conjunction with a fixed cam arranged in association with the tool holder in the magazine and a retractable, preferably hydraulically controlled cam, associated with the tool holder of the spindle; the latter cam opens the gripper jaws which are forced into the closed position by spring action.

The gripper fitted with gripper jaws which are forced into the closed position by spring action in accordance with the earlier suggestion, is designed in the form of a collet. A comparatively large amount of space is required between the tools to insert the opened collet, so that only a limited number of tools can be located over a given length, either on the periphery of a disc used as a tool magazine or in the longitudinal direction on a chain which serves as a tool magazine.

In accordance with a further embodiment of the invention the space required to hold the tools is reduced and hence the possible number of tools which can be provided on a given length increased, in that the gripper consists of two jaws which can be displaced in relation to each other in the direction of the tool axis; both these jaws have a radial opening corresponding to the diameter of the tool holder, while the tool holder is provided with a flange located below the magazine or outside the spindle and one of the two jaws is hollowed out to match the flange.

The gripper mechanism in accordance with the earlier suggestion acts on a spindle which is in the idle position while a second spindle in the working position acts on the workpiece. In the case of the machine is accordance with the earlier suggestion, the tool changing time is therefore included within the working time so that there is normally no need for particularly high tool changing speed.

However in the case of a single spindle machine in accordance with the invention tool changing must take place between two working operations, with the result that the maximum possible speed is essential for the tool changing operation.

A double gripper is already known for rapid tool changing, this gripper simultaneously takes hold of the tool located in the spindle and the new tool in the magazine and changes them over (U.S. patent specification 3,052,011). In the case of this known double gripper, swivelling of the tools in the magazine is necessary before the changing operation, but above all the position of a given tool in the magazine changes constantly, so that the tool itself must be marked. These two drawbacks are avoided in a different double gripper design, in which the double gripper extracts the tool axially from the magazine, runs forward to the tool holder in the spindle and then changes over the tools (U.S. patent specification 3,129,506). However in the case of this known tool changing mechanism the disadvantage mentioned earlier arises that the tool magazine must be arranged behind the spindle head and in this particular instance in accordance with the reach of the longest tool which is expected to be used. As a result a great deal more valuable space above the spindle is lost than in the case of a machine tool in accordance with the older suggestion mentioned earlier.

In order to avoid all these disadvantages, in accordance with a further embodiment of the invention two grippers which act on the same spindle tool holder are therefore provided; these grippers pass each other during their travel from the magazine to the spindle and back again. In order to change the tools, one gripper takes hold of the tool in the spindle and the other gripper takes hold of the tool in the magazine; both grippers then run past each other and place the tool in the magazine or spindle.

As they pass each other, the two grippers must have sufficient space, i.e. they must "make room" for each other. This is preferably achieved in that the two grippers swing apart as they pass. They may swivel round an axis parallel to the tool axis or alternatively around an axis vertical to the tool axis. The latter arrangement is preferable if it is anticipated that tools which project laterally beyond the relatively narrow gripper jaws, e.g. milling cutters, will have to be changed.

There is only room for a limited number of tools in a tool magazine arranged above the spindle. This limited number of tools is nearly always sufficient for machining a single workpiece, but difficulties may occur when changing over to a different workpiece so that the basic advantage of machine tools with automatic tool changing, i.e. the possibility of machining a number of different workpieces without significant resetting times may well be lost by reason of the fact that the tools in the magazine have to be changed.

In addition tools which have become worn after repeated use must be changed; this has to be done by hand and therefore requires a considerable amount of time during which the machine is stationary and cannot operate.

In accordance with a further embodiment of the invention the magazine is therefore interchangeable and a magazine changing mechanism is provided. When the programme is changed in the case of a machine of this type it is an easy matter to replace the existing tool set by a new tool set adapted to the new programme; if work is carried out for a long time with a particular tool set, a second, identical tool set can be kept available and used to replace the first set when signs of wear are observed. The first tool set can then be overhauled, i.e. reground, after which it will be available for standby use.

To obtain the correct programme it is essential for the tool magazine to occupy accurately the space allocated to it, so that the requisite tool is always fed to the transfer point by the machine control. A wide range of possibilities are known in order to achieve this aim; a design in which the magazine is provided with two fitting bores of differing diameter and the magazine support with corresponding fitting pins has proved particularly useful in practice.

If the magazine rotates around a vertical axis, in accordance with a special embodiment of the invention the tool changing mechanism can be designed in such a way that a gripper arm which rotates around a vertical column is arranged next to the machine bed while the magazine has a pin, which projects beyond the upper ends of the tools, together with a support flange. Especially in cases where it is necessary to replace a tool set in which the tools have become blunt, by a new tool set, the replacement process must be carried out as quickly as possible. In accordance with a particularly advantageous design of the invention, this is achieved in that the gripper arm has at least two arms, and is mounted on a swivel arm which also rotates around a vertical axis.

If it is simply a matter of changing the tool set when resetting the machine for a different workpiece, it will frequently be satisfactory to operate the tool-changing mechanism by hand. Of course this method entails the disadvantage that trained personnel must then be available at the machine in question and the tool changing operation will make additional demands on their time. If, however, worn tools must be replaced by new tools as soon as the wear is detected, manual changing will certainly take too long, and it will be preferable to design the changing mechanism so that it can be controlled, and is in fact controlled by the machine control system.

It has repeatedly been emphasized that the space for a tool in the magazine must be kept relatively small in order to house the requisite variety of tools, in particular drills of differing type and diameter. If the space for an individual tool in the magazine is limited, tools which take up a large amount of space cannot be properly housed in the magazine; this also applies to special tools which usually require a great deal of space. This applies primarily to heavy milling heads which require a great deal of lateral space, but extremely long drill shanks may also present problems. By "special tools" we refer e.g. to multi-spindle drilling heads or angle drilling heads. In order to house tools such as these, an additional tool magazine is provided in accordance with a further embodiment of the invention. These special tools are normally only required in relatively small numbers, but handling with the gripper device presents great difficulties on account of their weight and usually bulky shape. In accordance with a further embodiment of the invention, a tool magazine for special tools is therefore arranged below the spindle while the tools are held parallel to the spindle axis and inserted directly from the magazine into the spindle. A tool changing system is known in which the tools are mounted parallel to the spindle axis and inserted directly from the magazine into the spindle (Swiss patent specifications 258,358, 348,594 and U.S. specification 3,074,147).

If it is anticipated that only special tools of this type will be needed for machining the workpieces, it will of course be sufficient to provide a magazine of this type; the magazine for "normal" tools arranged above the spindle can then be omitted.

As mentioned earlier, there are a number of known embodiments for an additional magazine with tools mounted parallel to the spindle axis. However a new design has proved particularly suitable for a machine tool in accordance with the invention; in this design the tool magazine consists of a drum which rotates around an axis parallel to the spindle axis and slides in the direction of this axis, the drum having axially parallel fixing grooves; these fixing grooves will preferably be T slots or dovetailed grooves. If this magazine, as is usually the case, is designed as an additional magazine for special tools, the drum must either be sufficiently large for the tool spindle to penetrate between the individual tools when working with a "normal" tool from the main magazine, or else, and this is generally a more favourable solution, an idle position must be provided for the additional magazine in which the spindle can move without obstruction in the z axis through a special tool in the additional magazine.

To mount the tools in the fixing grooves, each tool will preferably be arranged to rotate in a holder which has a fixing pin corresponding to the fixing groove and can be fixed in position on the spindle sleeve. In the case of special tools, such as multi-spindle drilling heads or angle drilling heads, the head itself will naturally be designed as a holder of this kind; but in the case of other tools as well, e.g. heavy milling heads etc. the holder will again preferably be designed in this form so that it is suitable for fixing the tool perfectly in the magazine but, in spite of the inevitable imbalance of the holder during rotation can act perfectly in conjunction with the spindle. Even if two or more holders are arranged symmetrically it would in practice be very difficult to obtain a design ensuring perfect balance when holders are used.

The holding grooves are only designed to hold the tools on the magazine in the radial and tangential directions; they should not offer significant resistance to movement in the axial direction, so that the tools can be inserted easily and quickly in the spindle or returned to the magazine. It is, however, also desirable to secure the tool in the axial direction in the magazine, and for this purpose, in accordance with a further embodiment of the invention, a roller bolt is provided in the fixing pin; the bolt acts in conjunction with a cam—which has a holding notch at its highest point—in the base of the groove.

If the necessary degree of precision in machining is to be obtained when special tools are used, it is necessary for the tool, i.e. the holder, to be mounted on the spindle sleeve in such a way that the actual position differs from the specified position by an extremely small angle only, even with reference to rotation around the axis of the spindle. In order to ensure such a precise position, the holder will preferably have two spring-loaded index pins and the spindle sleeve two fitting bores corresponding to these pins. When the tools are changed automatically, the index pins can be pressed apart over an inclined plane if the retaining pin is fitted with a roller bolt; however in accordance with a further embodiment of the invention, as described above, each index pin engages with an angle lever, the other free arm of which engages with the roller bolt. When the tool is transferred from the magazine to the spindle, or vice versa, this automatically ensures that the index pins drop into the fitting bores or are retracted from the latter at exactly the right moment, without a relatively complicated control being required for this purpose.

If there is no space for an additional tool magazine below or above the spindle, it is possible to arrange instead an upright magazine in front of the spindle unit and next to the workpiece table; this magazine offers the tools to the spindle in the known manner (French patent specification 1,276,328). The tool holder and the associated structures can be designed exactly as in the case of an additional magazine arranged under the spindle; however if an upright magazine of this kind is used and particularly long tools are to be housed in it, in accordance with a further embodiment of the invention it is preferable to provide, for each individual tool, in each case one holder arranged close to the spindle and open in the radial direction and one holder further away from the spindle and surrounding the tool.

If the tool changing operation, which is relatively time-consuming because of the need for the spindle to travel to the upright magazine, is to be shortened, by moving the tool the mass of which is generally low by comparison with the relatively large mass of the spindle, in accordance with a further embodiment of the invention the upright magazine may have in each case one holder for the tool sliding parallel to the axis and acting in conjunction with a slide arranged in the loading position and having a recess which engages with a radial projection in the holder, said slide being preferably actuated by a hydraulic plunger.

The use of an upright magazine is particularly recommended if, in accordance with a further embodiment of the invention, a face plate with a numerically controlled face slide is arranged below the tool spindle.

If the slide is designed in such a way that an additional tool magazine can be arranged below the tool spindle, the said tool magazine being rotatable around an axis parallel to the tool spindle, i.e. if a corresponding bore is provided in the slide, the face plate may be secured in this bore in place of the additional tool magazine. The adaptability of the machine tool in accordance with the invention to widely varying requirements is considerably improved by a design of this type.

Depending on the requirements in the individual case, a face plate must also be fitted with a variety of tools. In order to ensure fully automatic operation, in accordance with a further embodiment of the invention, the face slide is also equipped for automatic tool changing.

Since the tool is normally stationary in the face plate, it is possible to provide a tool changing mechanism of the type already known for a punching tool. (U.S. patent specification 2,363,208). However in accordance with a further embodiment of the invention it is preferable to provide a tool holder with a central tightening screw and a lock to prevent rotation of the tool when clamped in position in the face slide. The advantage is then obtained that in principle tool changing takes place in the same manner as when changing a tool in the main spindle; the tool holder is therefore preferably designed as a female taper with a gear rim to prevent rotation which acts in conjunction with a corresponding gear rim on the tool or tool holder, as has already been suggested for the tool holder of a tool spindle, i.e. for rotating tools.

Alternatively, or additionally in the case of tools with comparatively large radial elongation, the tool holder may, in accordance with a further embodiment of the invention, consist of an axially projecting flange which fits into a corresponding recess in the tool holder.

In order to change the tool in the face plate it is naturally essential for the face plate to take up a precisely defined position, quite apart from the fact that the face slide must also take up an accurately defined radial position, which can easily be achieved by means of the numerical control. In order to determine a given position for the face plate, it is convenient to use an indexing pin; however instead of allowing this pin to drop into a fitting bore on the periphery of the face plate in the normal manner, in accordance with a further embodiment of the invention the pin is arranged behind the face plate so that it can be moved hydraulically into a fitting bore at the back of the face plate. Consequently the face plate can have a very large diameter without the space which is necessary in the radial direction being increased by the space for the indexing pin.

In addition, in accordance with a further embodiment of the invention, an indexing pin which is arranged behind the face plate and fits into a fitting bore at the back, may also be provided with a drive for rotation and may have a multi-edged head at its end which fits into the face plate, said head being insertable in a corresponding recess in the tightening screw in such a way that a joint with good torsional strength is established. As a result no separate actuation is necessary for the central tightening screw to fix the tool in position, so that the fixing system can be kept relatively simple.

When a tool holder with a central tightening screw is used, and in particular when a fitting bore is used on the back of the face plate, the face slide must be accessible from the back. In the position of action which is normally required, i.e. the centre of the face slide, the latter is not accessible in normal face plate designs, because the threaded adjusting spindle is arranged at this point. In order to make the centre of the back of the face slide accessible, in accordance with a further embodiment of the invention, the face slide is therefore guided on two threaded spindles which are arranged on either side of the central tightening screw.

Especially in the extreme poistion with maximum diameter, the face slide produces a considerable degree of imbalance on the face plate, and if work is to be carried out with fairly high cutting speed and in particular with relatively large turning diameters, it is necessary to compensate this imbalance. In accordance with a further embodiment of the invention, threaded spindles are therefore arranged on either side of the face slide; compensating weights for the face slide are guided on these spindles and are adjustable in the opposite direction to the face slide. Two compensating weight threaded spindles will preferably be provided in the plane of the face slide.

Figure 2:
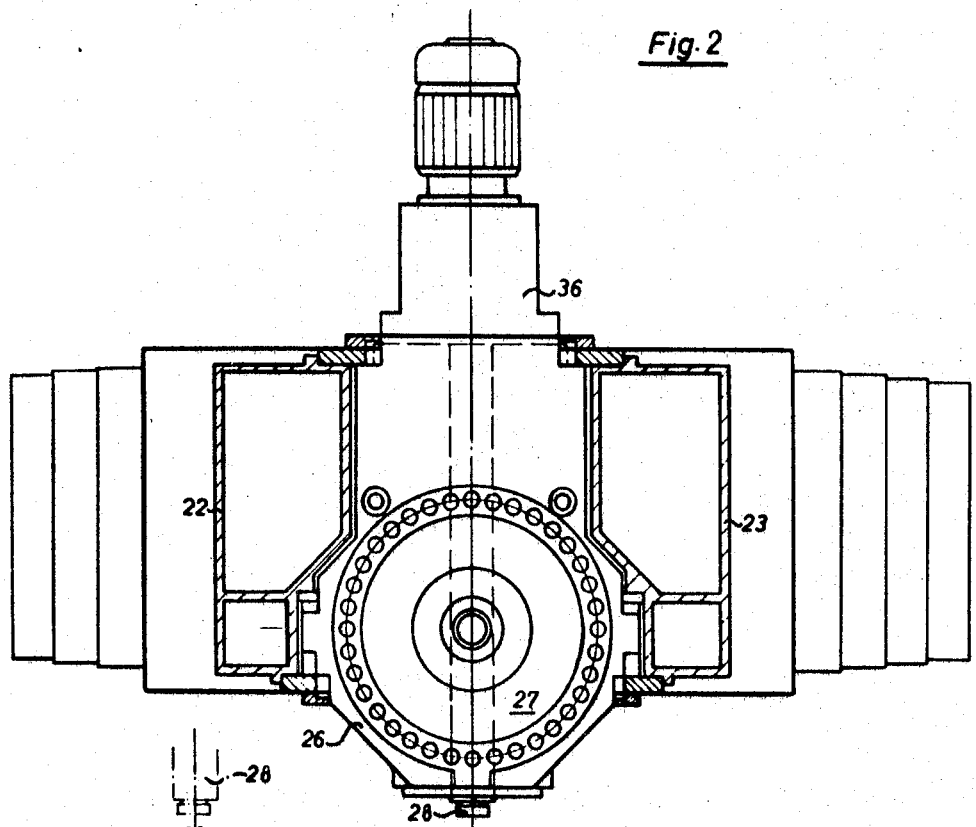
Figure 3:
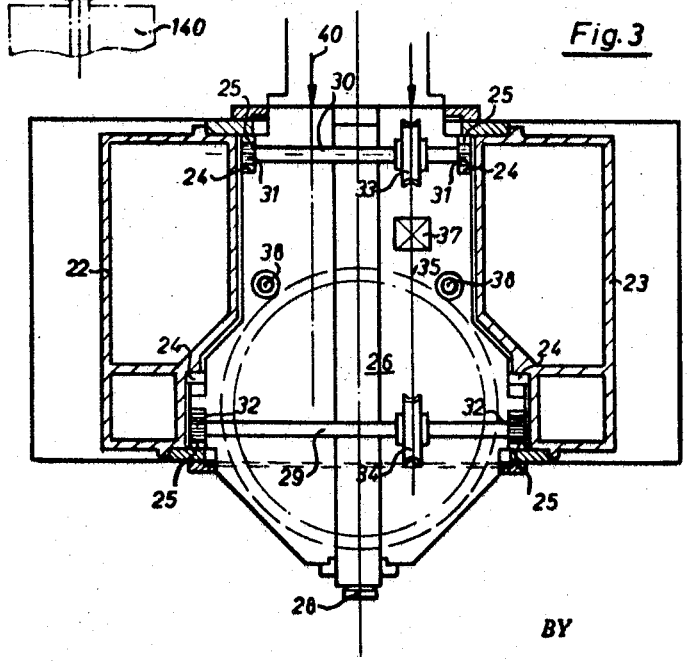
Figure 12:
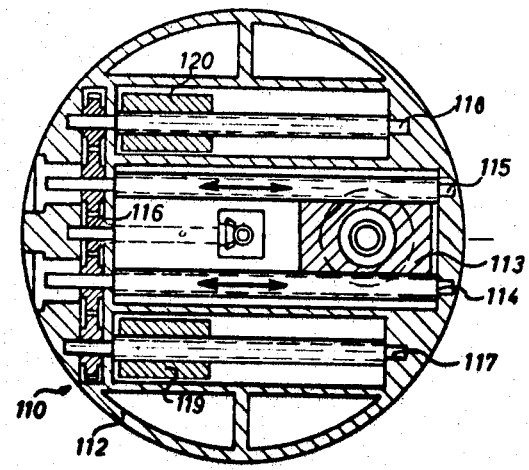
Figure 11:
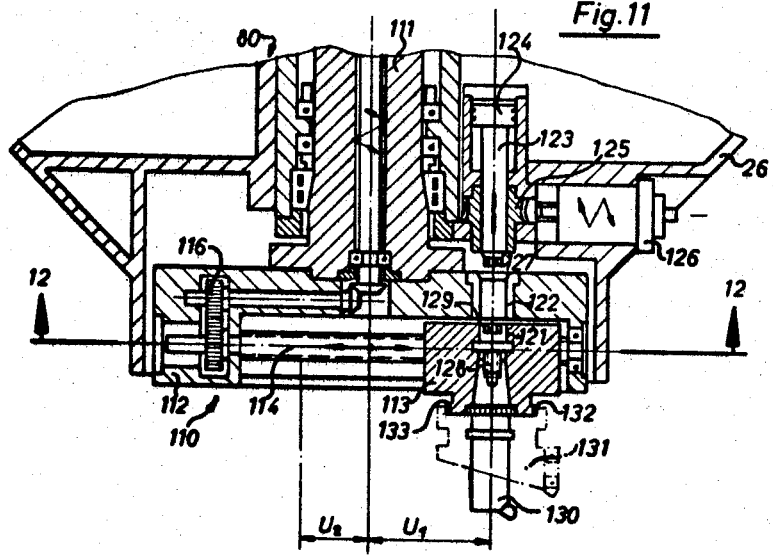
Figure 13:
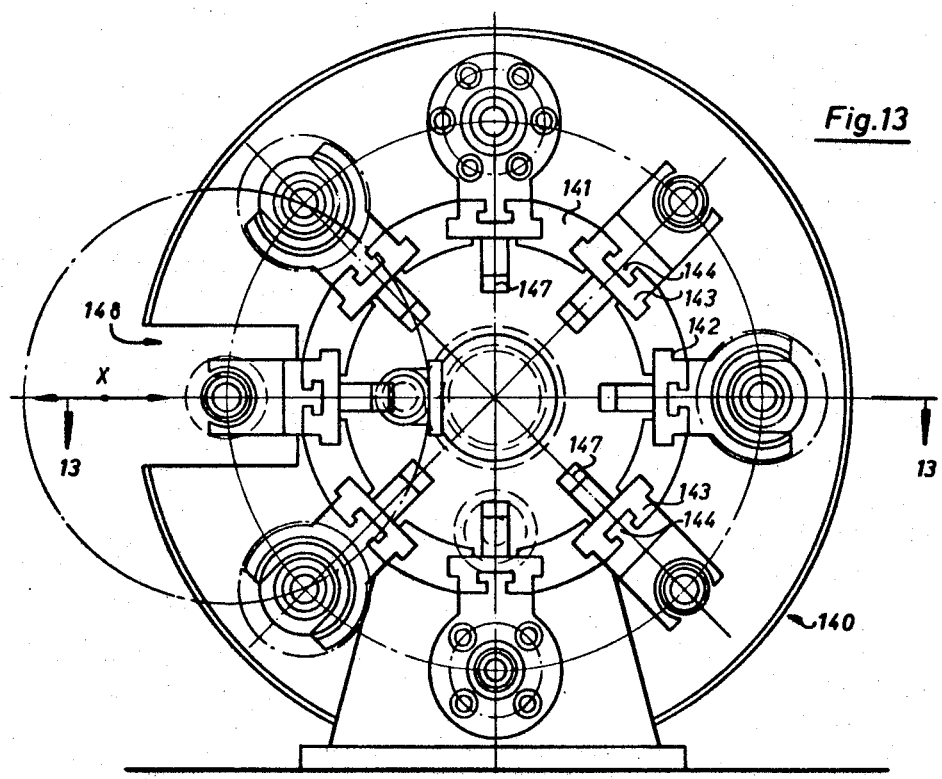
Figure 14:
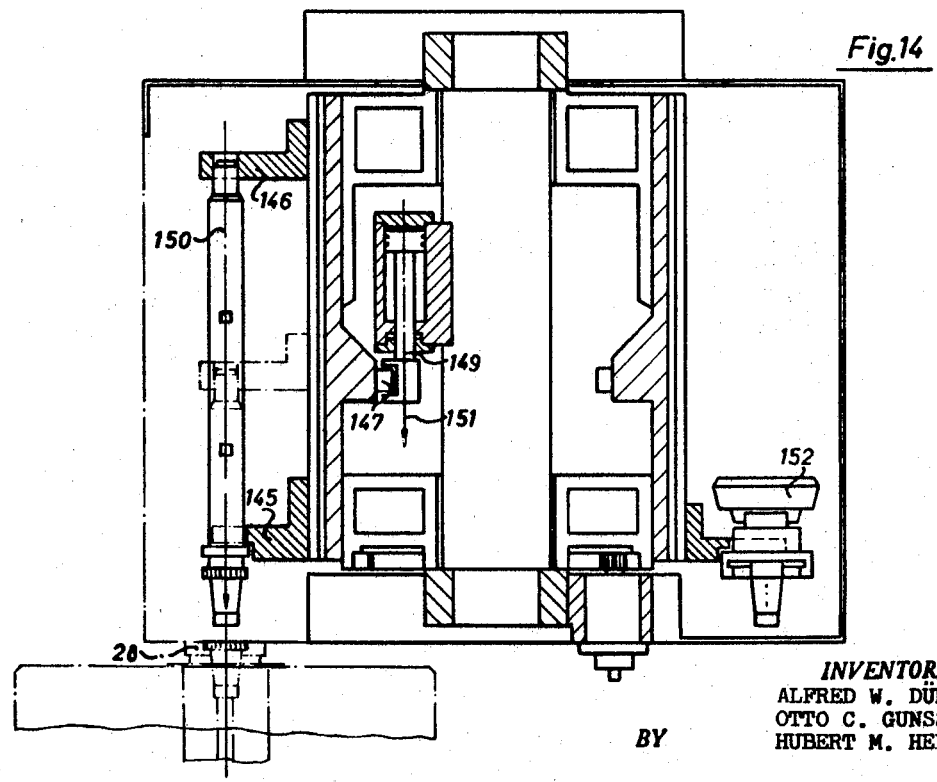
Figure 15:
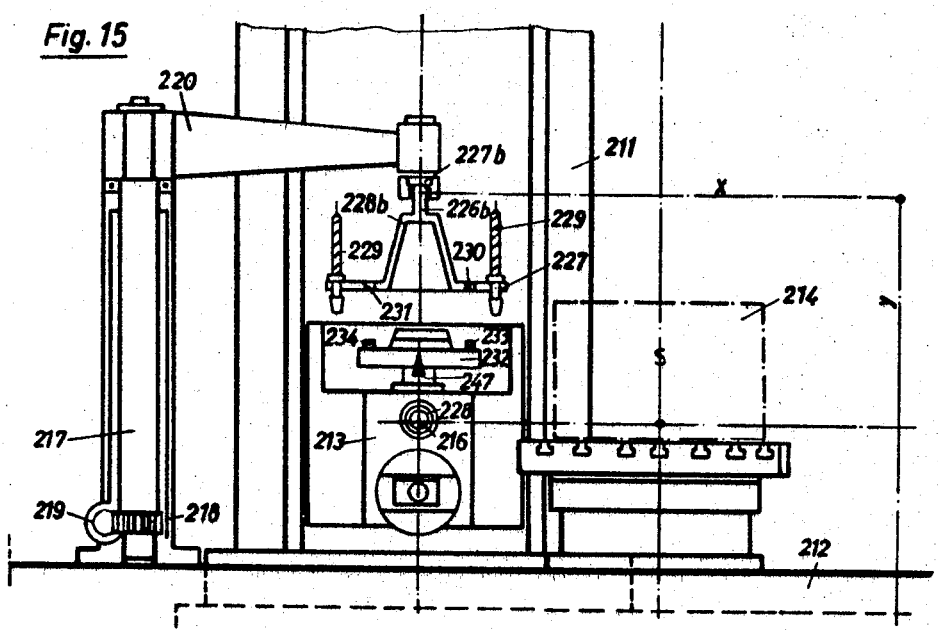

The invention will be described in greater detail on the basis of a practical embodiment shown by way of example in the drawing. The illustrations are as follows:

FIG. 1 shows a vertical section through a machine tool in accordance with the invention;

FIG. 2 a section along the line 2—2 in FIG. 1;

FIG. 3 a section along the line 3—3 in FIG. 1;

FIG. 4 a part sectional view of the tool magazine with the tool changing mechanism underneath again shown in part sectional view;

FIG. 5 a section along the line 5—5 in FIG. 4;

FIG. 6 an outline view of the two grippers in accordance with the invention, as they pass each other;

FIG. 7 the upper gripper jaw viewing from below;

FIG. 8 a developed projection of the paths of gripper travel;

FIG. 9 a part sectional view along the line 9—9 in FIG. 1;

FIG. 10 an additional tool magazine with a section through a tool holder;

FIG. 11 a part sectional view along the line 11—11 in FIG. 1;

FIG. 12 a section along the line 12—12 in FIG. 11;

FIG. 13 is a front view of an upright magazine in accordance with the invention;

FIG. 14 a section along the line 13—13 in FIG. 13;

FIG. 15 a front view of a machine tool in accordance with the invention, and

Figure 16:
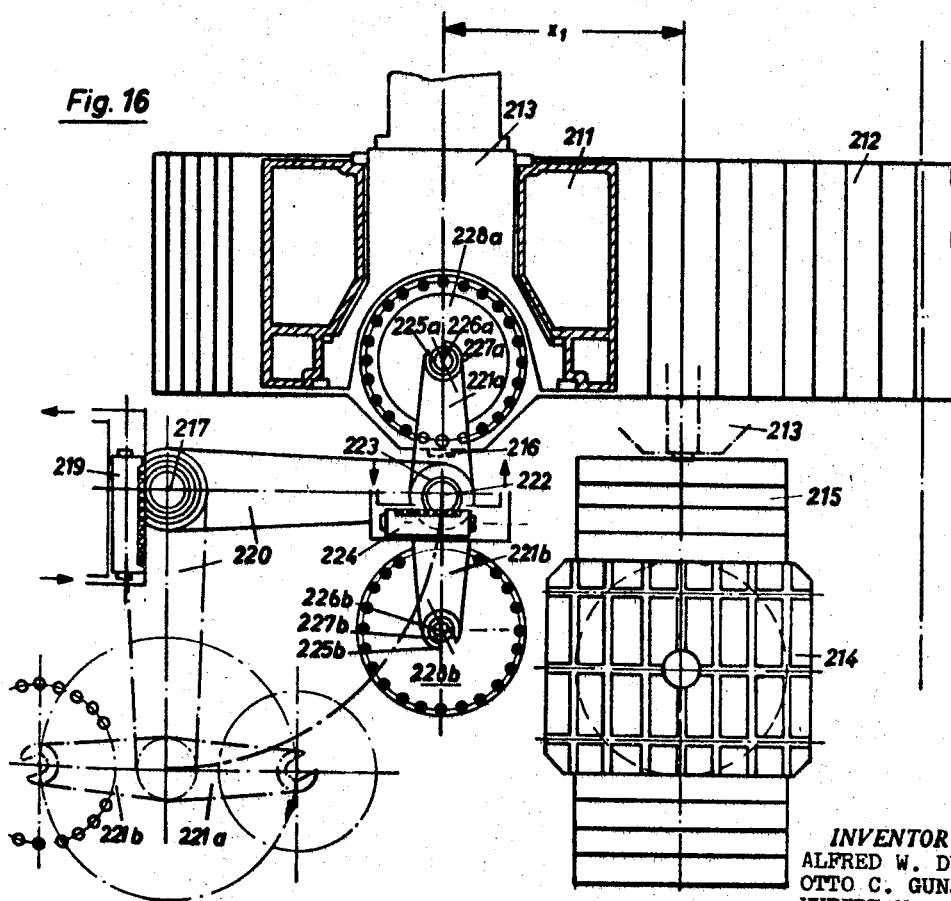

FIG. 16 a view of the machine in accordance with FIG. 15 from above.

The machine tool shown in the drawing consists of a slide plate 21 which moves on a machine bed 20 in the horizontal, i.e. $x$ axis; two columns 22 and 23 are mounted on the slide plate and each column carries two guides 24 and two racks 25 aligned vertically; the machine tool also consists of a slide 26—guided and moving vertically up and down in said guides—which carries a tool magazine 27 and a tool spindle 28. The slide 26 is equipped at the front and back with a drive shaft 29 or 30, on which in each case two pinions 31 or 32, which engage with one of the racks 25, are mounted. In addition the two shafts 29 and 30 each carry a worm wheel 33 or 34 which engages with a common worm shaft, which is indicated by its axis 35. This shaft 35 terminates in a drive box 36 at the $y$ feed drive.

Between the two worm wheels 33 and 34, the shaft 35 runs through an adjusting device 37, which operates in conjunction with an electronic spirit level of the known type which is not illustrated. Within the adjusting device 37 the shaft 35 is divided so that the two sections of the shaft can be rotated slightly in relation to each other.

In order to set a required position in the $y$ axis, the $y$ feed is brought into operation, the shaft 35 rotates, the two shafts 29 and 30 rotate accurately and uniformly and the slide moves up and down, its movement being controlled by the gear wheels 31, 32 and the racks 25. In order to relieve the load on the racks, two hydraulic relief cylinders 38 of the known type are arranged close to the centre of gravity of the slide. If the electronic spirit level signifies that the slide, i.e. primarily the tool spindle 28, is not precisely horizontal, e.g. is drawn downwards at the front by a tool with very large reach or very heavy weight, the adjusting device responds and rotates the front section of shaft 35 in relation to the rear section in such a way that the gear wheels 32 lift the front of the slide with the help of the racks 25. It is of course also possible to ascertain whether the centre tip of a particularly long tool has fallen out of alignment under its own weight, and by lifting the front of the slide in the manner described, it is possible to compensate such loss of alignment. Lifting of the front side is of course only possible within certain limits to ensure that the slide 26 does not jam in the guides 24 and damage the latter or the racks 25 and the gear wheels 31 or 32 which act in conjunction with the latter.

Above this $y$ adjusting device, a $z$ feed spindle 40 which extends approximately half way under the magazine 27 is arranged next to the spindle 28; this feed spindle 40 is indicated in FIG. 3 by its axis. The spindle engages in the usual manner in the spindle sleeve so that further description is superfluous.

The space below and above the slide 26, including the tool magazine is covered on all sides by telescopic metal panels 41, the design and arrangement of which do not require discussion in this specification.

The tool magazine 27 arranged above the tool spindle 28 consists in the practical embodiment of the invention illustrated here of a circular disc 45 (FIGS. 4 and 5) with recesses open towards the outside to hold tools such as 46 which are arranged to rotate on a vertical shaft 47. Adjustment of the tool magazine 27 into the required position is effected in the normal way and therefore requires no further discussion here; the tools 46 are mounted in the recesses which are open towards the outside.

Below the magazine disc 45, a gripper 48 or 49 is swivel mounted on either side of the tool spindle 28 around an axis 50 at right angles to the spindle axis. The two grippers are of identical design; for this reason only gripper 49 located in the feed device on the right in front of the spindle 28 in FIG. 5 is described here.

The gripper 49 consists of a support piece 51, which swivels around the axis 50, with a gripper jaw 52 and a second gripper jaw 53 which slides in the longitudinal direction of the support piece 51 and is forced towards the lower jaw 52 by a spring 55 guided on a pin 54. The guide pin 54 is also designed as a roller pin and carries a guide roller 56 on its lower side.

As can be seen from FIG. 7, the upper jaw 53 has a fixing aperture 57 which is open towards the outside, the width of this aperture $d1$ being adapted to the diameter of a tool holder 58, i.e. slightly larger than the latter, as shown in FIG. 7. On the underside a recess 59 is arranged concentrically in relation to the opening 57 and its diameter $d2$ is adapted to match the diameter of a holder flange 60 on tool holder 58, i.e. the diameter $d2$ is again slightly larger than the diameter of the flange. The lower jaw 52 is provided with a smooth fixing opening corresponding to fixing opening 57 and with the same opening width.

In the path of the two guide rollers 56 a fixed cam 61 is arranged viewing in the feed direction in front of the tool 46 located above the spindle, while a retractable cam 62 is arranged above the spindle 28 in the common path of travel of the two guide rollers 56. This cam is located on the piston rod 63 of a hydraulic piston 64, which is forced into its idle position by means of a spring 65, i.e. into the position shown in FIG. 5, in which the cam 62 is drawn away from the rollers 56. When the piston 64 is actuated with pressure fluid, the cam 62 is pushed forwards into the path of the rollers 56, as shown by the broken lines in FIG. 5.

A hydraulic piston 66 is provided to swivel the gripper 49; this piston moves a rack 67, which engages with a pinion—which is not shown for the sake of clarity—on the shaft 50. A slide 68 is located in the shaft 50; at one end this slide is guided in a guide groove 69 and at its other end it is pivoted onto the basic component 51 of the gripper 49 at position 70. The gripper 49 pivots around an axis 71 vertical to the shaft 50 at position 71; the plane of swivelling travel naturally varies with rotation around the shaft 50.

The mode of operation of the grippers will be explained on the basis of FIG. 8, in which the swivel travel of the two grippers is shown in developed projection, as a function of the swivel angle in degrees of angle.

We shall assume that the gripper 48 is in the waiting position behind the magazine while gripper 49 is in the waiting position between the magazine and spindle. Gripper 49 is swung out, by pivoting around the axis 71, from the straight connexion line between the spindle 28 and the tool position in magazine 45 above the spindle. A tool W1 which is to be exchanged for tool W2 is fitted in spindle 28. The tool W2 has therefore been brought into the position above the spindle 28 and in front of the gripper 48 by appropriate rotation of the magazine 45.

When the machining operation with tool W1 is completed, the grippers 48 and 49 are brought into motion simultaneously, and they swivel as shown in FIG. 8, towards the direction of lower torsional angles, i.e. towards the spindle. Gripper 48 takes hold of the tool W2 and gripper 48 then runs past the end of cam 61 so that the gripper closes under the action of the spring 55 and holds the tool firmly in position. During further movement, the gripper 48 extracts the tool W2 from the magazine and then swivels around its axis 71, until it reaches the position (40° angle) previously occupied by the gripper 49, except that gripper 48 has been swivelled around its axis 71 in the opposite direction, i.e. has to some extent moved out of the way of gripper 49 (see FIG. 6).

On the other hand, gripper 49 was again swivelled into the common, direct plane of connexion during its travel towards the spindle 28, so that it comes into position above the tool W1 and can take hold of the latter; during this process, cam 62 is of course advanced i.e. lies in the path of guide roller 56, so that the gripper 49 is opened. Cam 62 is then retracted and gripper 49 also runs back, but this time tool W1 is fixed as it passes the position of cam 62. The guide 69 again causes gripper 49 to swivel around its axis 71, so that the two grippers are swivelled through 20° in relation to each other (see FIG. 6) when they pass each other at an angular position of 40° in accordance with FIG. 8. As soon as gripper 49 has reached the angle of 40°, gripper 48 begins to run forwards towards spindle 28, from its position shown in dotted outline, in the same way as gripper 49 had moved earlier.

The cam 62 initially remains retracted until the tool is in front of the spindle at 0°. The spindle then travels forwards again, the tool is clamped and gripper 48 runs into the 40° or passing position, i.e. back to the position shown in dotted outline in FIG. 8; cam 62 is pushed forwards again, so that gripper 48 opens during its return travel and frees again tool W2 which had just been clamped. Meanwhile the tool magazine 45 has been rotated into the position for the tool W1 which is now brought back by gripper 49, so that the gripper 49 which continues to move with tool W1, i.e. swings back around the axis 71, can now insert the tool W1 into its position in the magazine. Gripper 49 then runs on to the position previously occupied by the gripper 48, so that the magazine can now move forwards to the next tool W3 required for machining; when this tool must be inserted in the spindle, the processes described above are repeated accordingly except that the movement of gripper 49 is now complete by gripper 48 and the movement of gripper 48 by gripper 49.

As shown in FIG. 1, a further bore 80 is also provided in the slide 26 below the spindle 28; a feed spindle 81 for feed in the z axis is located next to this bore. In accordance with FIG. 9, a hollow shaft 82 is mounted in this bore 80 and the spindle 83 of a magazine 84 for special tools is mounted in his hollow shaft. As mentioned earlier, we understand by the term special tools, those tools of which a part must be secured to the spindle sleeve, as is the case e.g. with multiple spindle drilling heads or angle drilling heads; however instead of special tools, particularly bulky tools, e.g. large milling heads, may be housed in the magazine 84.

As can best be seen from FIG. 10, the magazine 84 consists of a hexagonal disc with a radial flange 85, which has a T slot 86 in the axial direction in the centre of each side of the hexagon. In the base of each T slot 86 a cam or inclined surface 87 is provided which has a holding notch 88 at its highest point.

The holder 89 of a special tool which must be changed, e.g. a multi-spindle drilling head 90 in accordance with FIG. 9, is equipped with a holding pin 91, corresponding to the T slot in the magazine 84, a roller bolt 92 being mounted in the pin 91. The roller of this roller bolt 92 acts in conjunction with the cam 87 and the holding notch 88, as shown in the lower part of FIG. 9, in order to secure the holder 89 with a positive connexion to the magazine 84, i.e. in T slot 86.

As can be seen from FIG. 10, an angle lever 93 or 94 also engages in recesses in the roller bolt 92 and the free arms of these levers engage with index pins 97 or 98 which are loaded by springs 95 or 96. To fitting bores 100 or 101 corresponding to the index pin 97 or 98 are provided in the sleeve 99 of spindle 28.

If for example the multi-spindle drilling head 90 shown in FIG. 9 is to be changed for a different tool, the magazine 84 travels from the position shown to the position 84' indicated in dotted outline. Cam 87 then pushes the roller bolt 92 upwards, so that the index pins 98 and 97 are lifted out of the fitting bores 100 or 101 by angle levers 93 and 94 against the force of springs 95 and 96, and the locking of holder 89 to spindle sleeve 99 is accordingly broken. At the same time the roller bolt 92 drops into the holding notch 88, so that a certain measure of protection against axial displacement in relation to the magazine 84 is obtained. The tool is clamped to the spindle 28 in the same way as the tools from magazine 45, i.e. with a male taper on the tool and a female taper on the spindle as well as an external gear rim on the tool and an internal gear rim on the spindle.

After releasing, the spindle is retracted, so that the tool magazine can now rotate to a different position with tool 90 now held perfectly in place, i.e. either into an idle position for the magazine 102 (FIG. 10) in which the spindle 28 can be advanced freely so that it is able to operate with tools from the magazine 45, or else into a position in which it can hold another special tool from magazine 84.

When a new tool from magazine 84 is clamped, the processes described above take place in the reverse sequence; there is therefore no need for further explanation.

Instead of a magazine 84 for special tools a facing plate 110 may also be mounted in the bore 80, as shown in FIGS. 11 and 12. This unit consists of a shaft 111, the actual face plate 112 and a face slide 113, which can be radially adjusted.

The face slide 113 is guided between two threaded spindles 114, 115 which are driven by a common pinion 116 in the same way as the individual threaded spindle of a face slide normally provided. The centre of the face slide 113 therefore remains free so that the design which will be described later in connexion with FIG. 11, can be obtained.

In the same plane as the face slide 113 and the two threaded spindles 114 and 115, two further threaded spindles 117 and 118 are mounted in the face plate 112; these spindles are driven by pinions in the opposite direction to the face slide threaded spindles 114 and 115. On the threaded spindles 117, 118, compensating weights 119, 120 are guided and are displaced by the threaded spindles 117, 118 in the opposite direction to the face slide 113. The imbalance of the face plate which inevitably results from displacement of the face slide off centre, is compensated by these compensating weights 119, 120, so that the face plate can operate with relatively high speeds, even if the face slide 113 occupies an extreme position. The compensating weights 119, 120 are dimensioned in such a way that the weight of the face slide is counterbalanced by a medium-heavy tool; in the case of particularly light tools, the compensating weights will therefore lead to a slight imbalance while in the case of unusually heavy tools, the tool itself will cause a slight imbalance. However, if work is primarily carried out with a specific tool or tools of a particular weight, the compensating weights should preferably be chosen to suit the latter.

In the extreme radial position shown in FIG. 11, a bore 121 on the back of the face slide 113 coincides with a fitting bore 122 in the face plate 112, which for its part assumes a position such that the fitting bore 122 is located in front of an index pin 123 in the slide 26. The index pin 123 is at the same time designed as a piston rod of a hydraulic piston 124. In addition the index pin 123 is mounted in a worm wheel 125 which can be brought into rotation by means of a worm drive 126, so that the index pin 123 is also rotated. At its end facing the face plate 112, the index pin 123 has a multi-sided head 127.

A clamping screw 128 is mounted in the bore 121 of the face slide 113 and has a recess 129 corresponding to the multi-sided head 127 at its back. In addition the face slide 113 has, in the same way as the tool spindle 28, an internal taper with a gear rim which acts in conjunction with a corresponding male taper and gear rim on the tool.

In order to change a tool, e.g. a lathe tool 130, for e.g. a heavier lathe tool support 131 (shown in dotted outline), the face plate 112 is brought with its bore 122 in front of index pin 123, and at the same time the face slide 113 is brought into the extreme radial position shown in FIG. 11. The index pin 123 is then introduced into the fitting bore 122 by means of the piston 124 and rotated slowly by means of the dorm drive 126 through the worm 125, until the multi-sided head 127 engages in the recess 129. The drive 126 is then rotated in the direction required to release the clamping screw 128, so that the tool 130 is released and can be removed. The tool 132 is then inserted and clamped by reversing the sense of rotation of the worm drive 126; the index pin 123 is then drawn out of the holder 129 and the fitting bore 122 when pressure fluid acts on the piston 124 from the other side. The face slide is then brought into the specified position and the machining operation can begin.

In addition to the clamping taper, the holder of tool 131 also has an axial recess 132, into which an axially projecting flange 133 of the face slide 113 fits. The latter serves to protect the tool 131 against torsional movement, either in addition to a gear rim or in place of such a rim.

The process of changing a tool 130 for a tool 131 on the face slide 113, described above, may be effected by hand, but for fully automatic operation of a machine tool in accordance with the invention, tool changing takes place automatically. For this purpose an upright magazine 140, shown in greater detail in FIGS. 13 and 14, is arranged in front of the spindle unit mounted on the slide plate 21 and offset by an amount X in the axis in relation to the central position of the spindle 28 (indicated in outline in FIG. 2). If all the positions in this magazine are not used for tools for the face plate, the magazine can of course also be used for tools for the main spindle 28, above all for very long drilling rods, special tools or particularly bulky tools as described with reference to the magazine 84 mounted in the bore 80 in place of the face plate.

The upright magazine 140 consists of a drum 141 with a number of T slots 142 running in the axial direction, a holder 143 being arranged to move axially parallel in these slots. The holders 143 consist of rails with appropriate shape; each rail also has a T slot 144 in which holder arms e.g. 145 and 146, which match the tool are secured; alternatively the holders may also be secured in the T slots 144 in the manner described for magazine 84 with reference to FIGS. 9 and 10.

On the side facing away from the slots 144, each adjustable holder 143 has a projection 147 which engages with the hydraulic slide 149 provided in the loading position 148.

If a tool in magazine 140 is to be inserted in a tool holder, either the tool holder of face plate 110 or the tool holder of main spindle 28, the latter is first brought in front of the loading position 148 of the magazine 140, as shown in dotted outline for spindle 28 in FIG. 14 (see also FIG. 2); at the same time the tool which is to be inserted in spindle 28, e.g. a drilling rod, 150, is also brought into the loading position 148, so that the two components are in alignment. The slide 149 is then moved hydraulically in the direction indicated by the arrow 151 and the tool 150 is accordingly inserted in the spindle 28. Clamping takes place in the manner described earlier; the spindle 28 rotates slowly in the normal manner. After clamping, the slide 149 moves the holder 143 back in the opposite direction to that indicated by the arrow 151, so that the front end of the drilling rod 150 is freed from the closed holder 146. As soon as this is done, the spindle 28 can travel away from the upright magazine 140 in the $x$ axis, and position the tool as required in the other co-ordinates. To unload the spindle, the above procedure is reversed.

If the tool, e.g. a milling cutter 152, does not have a long reach in the axial direction, it is of course possible to omit the holder 146 and use instead a simple holder 145, designed to operate in the same way as the holding system of the upper gripper jaw 53 of the tool changing gripper for tools 46 from the magazine 45.

The machine tool 211 in accordance with FIGS. 15 and 16 is a double column machine like that shown in FIGS. 1 to 8, which travels in the $x$ axis on a machine bed 212; the tool slide 213 can be raised and lowered in the $y$ axis and moved towards the workpiece 214 in the $z$ axis. The workpiece 214 is clamped on a fixed workpiece table 215; it does however rotate around its vertical axis when another side of the workpiece must be presented to the spindle 216 for machining.

At the left-hand end of the machine bed 212 shown in the drawing, a column 217 which rotates around a vertical axis is arranged in front of the machine bed and provided with a gear wheel 218 at its lower end, said gear wheel engaging with a toothing on a hydraulically actuated piston 219. At the upper end the column 217 has a swivel arm 220, which carries at its free end a gripper arm 221 with two arms 221a and 221b. The gripper arm 221 is suspended from a pivot pin 222 which carries a gear wheel 223; this gear wheel engages with the gearing of a hydraulically actuated plunger 224.

At their free ends, the two arms 221a and 221b each have a slot 225a or 225b in which a pin 226a or 226b is located, said pin being provided with a support flange 227a or 227b which engages over the side edges of the slot 226 and is accordingly secured to the latter. The pin 226 is located on an interchangeable magazine 228 and extends sufficiently far beyond the plane of the latter, for the support flange 227a or 227b to project reliably beyond the upper ends of the tools 229.

The slots 225a or 225b are aligned in such a way that they form parts of a circle around the column 217 when they are located above the magazine which is mounted on the spindle slide, i.e. in the position shown in the drawing, the slot 225a forms a circle around the column 217; when gripper arm 221 is rotated through 180° around the axis 222, the slot 225b lies on the circle round column 217.

The magazine 228 has two fitting bores 230 and 231 of unequal size, and a magazine support 232 on the tool slide 213 has two corresponding fitting pins 233 or 234.

During normal operation of the machine, the machine tool unit is located approximately in the position 213' indicated in dotted outline (FIG. 16), according to the position of the workpiece 214 at which machining is required. The swivel arm 220 and the gripper arm 221 assume the position shown in dotted outline in FIG. 16, and marked 220' or 221b' and 221a'.

If the tool magazine 228a is to be changed, the machine unit 211 is brought into the position shown in the drawing, i.e. at a distance from the column 217 corresponding to the length of the swivel arm 220. It should be mentioned that the workpiece 214 may safely extend as far or even further than this point; it will then merely be necessary to choose a height for the column 217 appropriately larger than that shown in the drawing; the slide unit 213 can obviously travel sufficiently far upwards in the vertical direction.

As soon as the machine unit 213 reaches the position shown, the swivel arm 220 is swung back to the position shown in the drawing by appropriate actuation of the piston 219 with pressure fluid; the free end of the gripper arm section 221a with the slot 225a is then pushed over the pin 226a of the magazine 226a and below the support flange 227a of this magazine. The slide unit 213 is then lowered far enough for the upper section of the slide or magazine support 232 to lie below the lower end of the tools 229. The piston 219 is then again actuated with pressure fluid in the opposite direction, so that the swivel arm 220 swings back again to position 220' (FIG. 16). In this position the gripper arm 221 is rotated through 180° by appropriate actuation of the piston 224 with pressure fluid; piston 219 is then once again actuated with pressure fluid so that the swivel arm 220 returns to the position shown in FIG. 16, except that the section 221b of the gripper arm now faces the machine 211 or is positioned above the slide unit 213. The slide unit 213 is then raised again, until the new magazine 228b is located in the requisite position on the magazine support 232. Since magazine 228b will not necessarily be in the required rotary position with reference to the magazine support 232, the latter will preferably be rotated slowly while the slide unit 213 is raised, until the larger of the two fitting pins 233 and 234 drops into the corresponding bore and the magazine 228b then rests flush on the magazine support 232.

The swivel arm 220 is then swung back into the position 220' (FIG. 16), and the machine unit 211 runs back into the position at which slide unit 213 occupies the position 213'; the new machining operation can then begin.

In view of the simplicity of the movements involved, it should be possible to provide either manual or automatic control from the control system of machine 211 for the operations described above using normal design elements, so that there is no need for further explanation here.

What is claimed is:

1. A machine tool including a spindle and tool magazine support assembly; a spindle horizontally mounted on said support assembly and having means for mounting a tool on one end thereof; at least one tool magazine rotatably mounted on said support assembly above said spindle and rotatable about a vertical axis; said tool magazine having means for vertically supporting tools; and a gripper assembly rotatably mounted on said support assembly for gripping and swiveling tools in an arc between said tool magazine and said spindle.

2. The machine tool in accordance with claim 1 characterized further in that said gripper assembly includes at least a pair of jaws movable relative to one another in the direction of the tool axis when at said tool magazine or said spindle axis, each of said jaws having an opening therein extending around at least 180° of a circle to receive a tool holder therein and at least one of said jaws having an enlarged portion at the opening therein to receive an enlarged portion of the tool holder.

3. A machine tool comprising a support assembly; a tool spindle horizontally mounted on said support assembly and having means for mounting a tool on at least one end thereof; at least one tool magazine rotatably mounted on said support assembly above said tool spindle including a circular disc and means for vertically supporting tools on said disc with tool mounting means of said tools positioned below said disc and above said spindle; a gripper assembly rotatably mounted on said support assembly for gripping and swiveling tools in an arc between said tool magazine and said spindle including at least a pair of tool gripping arms for moving tools from said tool magazine to said tool spindle; means on one end of said arms for gripping the tool mounting means of the tools; means for rotatably mounting said arms on said support assembly below said disc about horizontal axes perpendicular to the axis of said tool spindle to move tools between said magazine and said spindle, and means on said gripper assembly for rotating at least a portion of said arms including said one ends about second axes perpendicular to said horizontal axes to move said one ends of said arms apart to permit said one ends of said arms to pass one another during movement of the tools between said magazine and said spindle.

4. The machine tool of claim 1 wherein said gripper assembly is mounted on said support assembly rotatable about a horizontal axis perpendicular to and intersecting the axis of said spindle whereby the tool is moved through an arc of substantially 90° changing its axis from vertical and perpendicular to the spindle axis to horizontal and coaxial with the spindle axis.

5. A machine tool including a spindle and tool magazine support assembly; a spindle horizontally mounted on said support assembly and having means for mounting a tool on one end thereof; at least one tool magazine rotatably mounted on said support assembly above said spindle and rotatable about a vertical axis; said tool magazine having means for vertically supporting tools; a gripper assembly rotatably mounted on said support assembly for gripping and swiveling tools in an arc between said tool magazine and said spindle; a fixed cam mounted on said support assembly engageable by said gripper assembly during rotation thereof for opening said gripper assembly on tools at said tool magazine, a retractable cam mounted on said support assembly engaging a portion of said gripper assembly for opening said gripper assembly on tools in said tool spindle, said gripper assembly including means for closing said gripper assembly on tools at said tool magazine and said spindle.

6. A machine tool including a spindle and tool magazine support assembly; a spindle horizontally mounted on said support assembly and having means for mounting a tool on one end thereof; at least one tool magazine rotatably mounted on said support assembly above said spindle and rotatable about a vertical axis; said tool magazine having means for vertically supporting tools; and a gripper assembly rotatably mounted on said support assembly for gripping and swiveling tools in an arc between said tool magazine and said spindle, said gripper assembly including at least two pair of gripper jaws and means for mounting said pairs of gripper jaws for movement of tools thereon from said tool magazine to said spindle and passage of said pairs of gripper jaws past one another during travel between said magazine and said spindle.

7. The machine tool in accordance with claim 6 including means for swinging said pairs of gripper jaws apart as they pass each other during travel between said magazine and said spindle.

8. The machine tool in accordance with claim 7 including means for rotating at least one of said pairs of gripper jaws about an axis perpendicular to the tool axis to move said pairs of gripper jaws apart as they pass each other during travel between said magazine and said spindle.

9. The machine tool in accordance with claim 3 including a fixed cam mounted on said support assembly engageable by said gripper assembly during rotation thereof for opening said gripper assembly on tools at said tool magazine, a retractable cam mounted on said support assembly engageable with said gripper assembly for opening said gripper assembly on tools in said tool spindle and spring return means mounted on said arms for closing said gripper means on tools at said tool magazine and said spindle.

10. The machine tool in accordance with claim 3 characterized further in that said gripping means comprises at least a pair of jaws movable relative to one another in the direction of the tool axis when at said tool magazine or said spindle axis, each of said jaws having an opening therein to receive a tool holder therein and at least one of said jaws having an enlarged portion at the opening therein to receive an enlarged portion of the tool holder.

References Cited
UNITED STATES PATENTS

| | | | |
|---|---|---|---|
| 3,281,935 | 11/1966 | Zankl et al. | 29—568 |
| 3,312,370 | 4/1967 | Kolarich et al. | 29—568 |

FRANCIS S. HUSAR, Primary Examiner

U.S. Cl. X.R.

29—26; 90—11, 13; 82—2; 77—25